United States Patent [19]

Matsumoto

[11] Patent Number: 4,595,631
[45] Date of Patent: Jun. 17, 1986

[54] MAGNETIC RECORDING MEDIA COMPRISING CARBON BLACK-ADSORBED METAL OXIDE PARTICLES IN A MAGNETIC RECORDING LAYER

[75] Inventor: Yukio Matsumoto, Mito, Japan

[73] Assignee: Victor Company of Japan, Limited, Japan

[21] Appl. No.: 521,577

[22] Filed: Aug. 9, 1983

[30] Foreign Application Priority Data

Aug. 10, 1982 [JP] Japan ............................ 57-137892
Sep. 21, 1982 [JP] Japan ............................ 57-163102

[51] Int. Cl.$^4$ ............................................. G11B 5/706
[52] U.S. Cl. ................................... 428/323; 428/329; 428/694; 428/900
[58] Field of Search ............... 428/692, 694, 900, 328, 428/329, 403, 323; 252/62.55

[56] References Cited

U.S. PATENT DOCUMENTS

| | | | |
|---|---|---|---|
| 3,811,942 | 5/1974 | Rennolds | 428/328 |
| 3,843,403 | 10/1974 | Haines | 252/62.55 |
| 4,047,232 | 9/1977 | Hisagen et al. | 428/480 |
| 4,076,551 | 2/1978 | Bernhard et al. | 428/403 |
| 4,135,032 | 1/1979 | Akashi et al. | 428/328 |
| 4,264,698 | 4/1981 | Takayama et al. | 252/62.55 |
| 4,275,114 | 6/1981 | Schoenafinger et al. | 428/328 |
| 4,379,803 | 4/1983 | Tamai et al. | 428/331 |
| 4,420,532 | 12/1983 | Yamaguchi et al. | 428/694 |
| 4,474,843 | 10/1984 | Miyoshi et al. | 428/328 |

Primary Examiner—George F. Lesmes
Assistant Examiner—William M. Atkinson
Attorney, Agent, or Firm—Lowe, Price, LeBlanc, Becker & Shur

[57] ABSTRACT

Magnetic recording media are disclosed which comprise a support, and a magnetic recording layer formed at least one side thereof. The recording layer comprises a dispersion, in a binder, of magnetic particles and non-magnetic particles of a metal oxide selected from titanium dioxide, aluminium oxide, chromium (III) oxide and mixtures thereof. Carbon black powder is adsorbed on the metal oxide particles in an amount of from 0.5 to 20 wt % based on the weight of the non-magnetic metal oxide.

5 Claims, 4 Drawing Figures

MAGNETIC RECORDING MEDIA COMPRISING CARBON BLACK-ADSORBED METAL OXIDE PARTICLES IN A MAGNETIC RECORDING LAYER

BACKGROUND OF THE INVENTION

1. Field of the Invention

This invention relates to the magnetic recording art and more paticularly, to improved magnetic recording media comprising a specific type of non-magnetic material in the form of particles in a magnetic recording layer thereof. The term "magnetic recording media" used herein is intended to mean various media including magnetic video or audio tapes, magnetic discs such as floppy discs and hard discs, magnetic cards, and the like.

2. Description of the Prior Art

As is well known in the art, magnetic recording media such as magnetic tapes for use in video tape recorders, floppy discs, and the like comprise oxide powders such as $Cr_2O_3$ and/or $Al_2O_3$ in the magnetic layer thereof in order to improve the abrasion resistance of the magnetic layer. Moreover, carbon black is added so as to improve antistatic and light-shielding properties of the magnetic layer.

However, these additives must be used in relatively larger amounts in order to attain desired effects thereof. Use of these additives in larger amounts results in a smaller packing density of a magnetic powder in the magnetic layer. Additionally, the magnetic layer becomes so rough on the surface thereof that magnetic characteristics lower. Thus, an improvement of a certain characteristic or property is now attained only with a sacrifice of other desirable characteristics.

From the standpoint of magnetic characteristics such as a recording density, it is desirable to reduce the amount of $Al_2O_3$ and/or carbon black. However, this reduction is disadvantageous in improving the antistatic property, light shielding tendency, abrasion resistance and the like. Accordingly, there is a demand for materials which are effective in improving such characteristics as a whole even when used in relatively small amounts.

SUMMARY OF THE INVENTION

It is an object of the present invention to provide magnetic recording media which comprise a specific type of non-magnetic oxide powder in a magnetic layer thereof whereby various characteristics of the media such as a surface resistivity, light-shielding tendency, demagnetization characteristic after repetition of reproduction cycles, and the like are improved even when the oxide powder is used in a relatively small amount.

It is another object of the invention to provide magnetic recording media which have a good abrasion resistance and durability.

It is a further object of the invention to provide magnetic recording media which have excellent antistatic properties so that dust deposition is substantially decreased.

It is a still further object of the invention to provide magnetic recording media which are excellent in travelling performance and are well light-shielded so that a transparent portion of the media can be conveniently detected by a detector mechanism such as a photosensor without involving malfunction.

The above objects can be achieved, according to the present invention, by a magnetic recording medium which comprises a support, and a magnetic recording layer formed on at least one side of the support. The recording layer is made of a dispersion, in a resin binder, of magnetic particles and non-magnetic particles of a metal oxide selected from the group consisting of aluminium oxide, titanium dioxide and chromium (III) oxide and adsorbing thereon a carbon black powder having an average size below 100 millimicrons. The carbon black-adsorbed metal oxide particles are used in an amount of from 0.5 to 30 wt% for $Al_2O_3$ and $TiO_2$, and in an amount of from 0.5 to 15 wt% for $Cr_2O_3$, both based on the magnetic particles used. When these carbon black-adsorbed metal oxides are used in combination, the total amount of the mixture should be in the range of from 0.5 to 30 wt% based on the magnetic particles provided that the carbon black-adsorbed $Cr_2O_3$ is add in an amount of up to 15 wt% if used.

DETAILED DESCRIPTION AND PREFERRED EMBODIMENTS OF THE INVENTION

Figure 1:
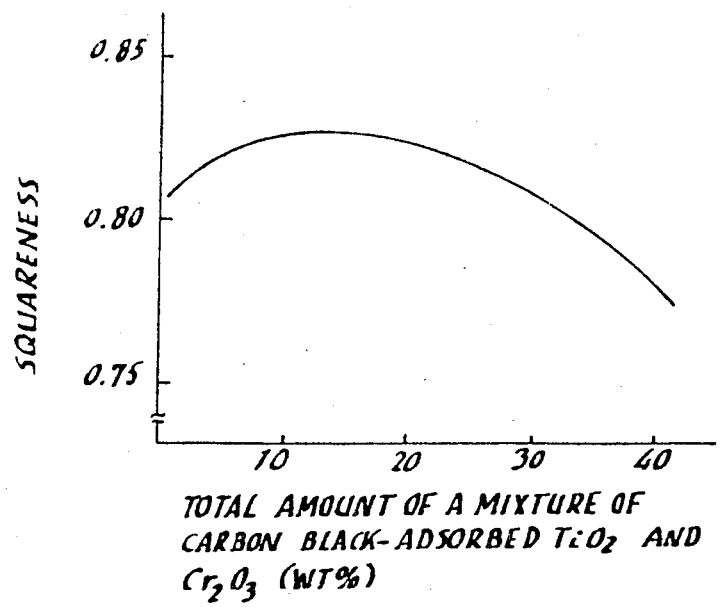
FIG. 1 is a graphical representation of the relation between the squareness of magnetic recording media and the amount of a mixture of carbon black-adsorbed $Cr_2O_3$ and $TiO_2$ particles in a mixing ratio of 2:3 on the weight basis.
Figure 2:
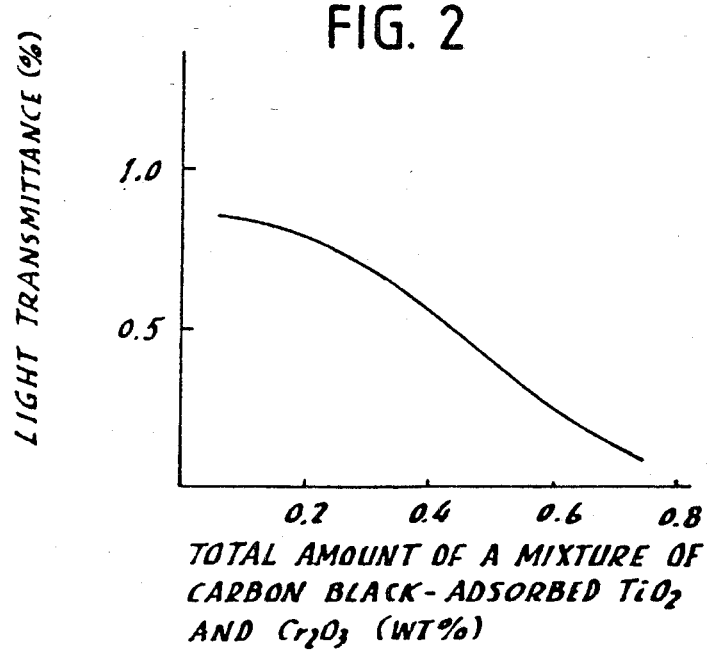
FIG. 2 is a graphical representation of the relation between the light transmittance and the amount of a mixture of carbon black-adsorbed $Cr_2O_3$ and $TiO_2$ particles in a mixing ratio of 2:3 on the weight basis.
Figure 3:
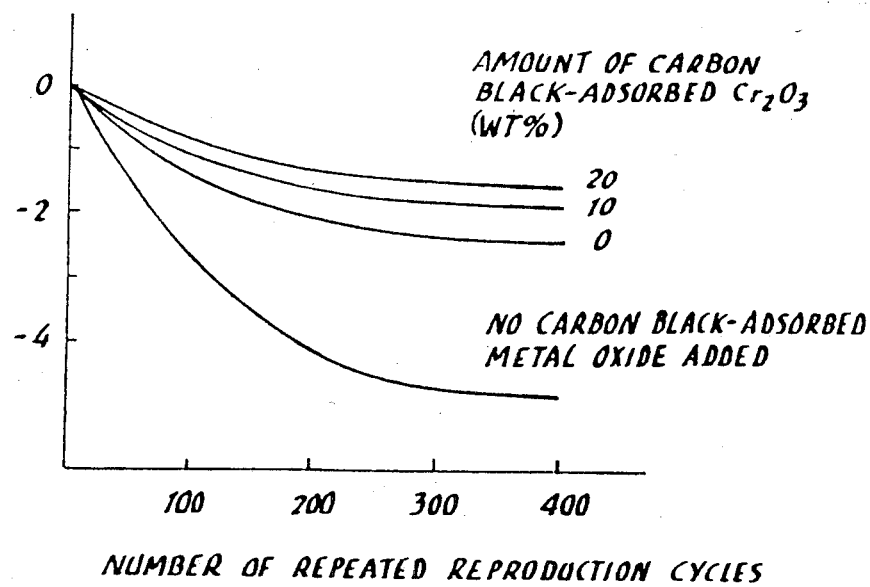
FIG. 3 is a graphical representation of the relation between the demagnetization characteristic and the repeated number of reproducing cycles for different amounts of the carbon black-absorbed $Cr_2O_3$ particles in which the total amount of carbon black-adsorbed $Cr_2O_3$ and $TiO_2$ is 30 wt% based on magnetic particles in a magnetic layer.

As described before, the present invention is characterized by the use of the specific type of non-magnetic carbon black-adsorbed metal oxide in a magnetic recording layer in combination with magnetic particles which are dispersed in a binder. The carbon black-adsorbed metal oxide is prepared by any known technique. For instance, a carbon black powder having a predetermined size and an intended metal oxide powder are mixed under high temperature and high pressure conditions. The carbon black may be adsorbed to an extent. The amount of the carbon black adsorbed on the metal oxide particles used in the present invention is generally in the range of from 0.5 to 20 wt% of the metal oxide particles. Less amounts are not effective. Larger amounts are disadvantageous in that the carbon black cannot be fully adsorbed on the metal oxide and an excess of the carbon black tends to come off. In addition, the metal oxide on which larger amounts of carbon black are adsorbed becomes poor in dispersability. Upon preparation of the absorbed metal oxide particles, the carbon black powder is controlled to have an average size below 100 millimicrons and a specific surface area over 30 $m^2/g$. Preferably, the average size of the carbon black powder is in the range of from 10 to 70 millimicrons. The carbon black-adsorbed metal oxide particles are finely divided to have an average size of from 0.01 to 5 microns. The metal oxides used in the practice of the present invention include $Al_2O_3$, $TiO_2$, $Cr_2O_3$, and mixtures thereof. The adsorbed metal oxide particles are usually admixed with magnetic particles in an amount of from 0.5 to 30 wt% based on the magnetic particles except that carbon black-adsorbed $Cr_2O_3$ particles are used. With the adsorbed $Cr_2O_3$ particles, the amount is in the range of from 0.5 to 15 wt% of the magnetic particles. When the $Cr_2O_3$ particles are used in combination with other metal oxide particles, the total amount of the mixture should be in the range of from 0.5 to 30 wt% provided that the amount of the $Cr_2O_3$ particles is in the range of from 0.5 to 15 wt%, all based on the weight of the magnetic particles contained in the magnetic layer.

The magnetic recording layer of a recording medium according to the invention is made of a mixture of magnetic particles and carbon black-adsorbed metal oxide particles dispersed in a resin binder. This layer may be formed on one side or opposite sides of a support, depending on the type of medium. The magnetic recording layer is not of the specific type except that metal oxides on which carbon black is adsorbed thereon are contained in the layer. For instance, magnetic particles may be made of conventional magnetic materials which are properly used depending on the type of recording medium. This is true of binders dispersing the magnetic particles therein. Hence, the magnetic materials and binders for use in the magnetic recording media of the invention are briefly described.

Useful magnetic materials include, for example, ferromagnetic iron oxides such as gamma-$Fe_2O_3$ and $Fe_3O_4$ with or without additional metals such as Co, Ni, Mn and the like, ferromagnetic metals such as Fe, Co, Ni and the like, and alloys thereof. These metals or alloys may include additional metals such as Al, Cr, Mn, Cu and the like. Other ferromagnetic materials such as $CrO_2$ may also be used.

Binders for these magnetic materials may be any known thermoplastic resins, thermosetting resins, and mixtures thereof. Typical examples of the thermoplastic resins include vinyl chloride-vinyl acetate copolymers, vinyl chloride-vinylidene chloride copolymers, acrylic ester-styrene copolymers, methacrylic ester-styrene copolymers, acrylic ester-vinylidene chloride copolymers, methacrylic ester-vinylidene chloride copolymers, urethane elastomers, cellulose derivatives, vinyl chloride-vinyl acetate-vinyl alcohol terpolymers, and various other synthetic rubber resins. Examples of the thermosetting resins include phenolic resins, epoxy resins, alkyd resins, silicone resins, urea-formaldehyde resins, mixtures of isocyanates and polyols, and the like resins. These binder resins, both thermoplastic and thermosetting, may be used singly or in combination.

In the fabrication of magnetic media, magnetic materials are dispersed in resin binders dissolved in solvents in an amount of from 200 to 800 parts by weight per 100 parts by weight of the binder. The resulting dispersion is applied onto a support and cured to form a magnetic layer on the support as usual. Typical solvents for binders are alcohols such as methanol, ethanol, and the like, aromatic compounds such as xylene, toluene, benzene and the like, ketones such as acetone, methyl ethyl ketone, methyl isobutyl ketone and the like, and mixtures thereof. As a matter of course, the dispersion may further comprise any known additives such as dispersants, lubricants, abrasive agents, anti-static agents, surfactants and the like as is well known in the art.

Suitable supports include, for example, films, foils, sheets of a variety of materials. Typical materials include synthetic or semi-synthetic resins such as polyesters, polyolefins, cellulose derivatives, and the like, metals such as aluminium, copper and the like, glasses or ceramics. Of these, synthetic resins including polyesters are preferably used.

The present invention is particularly described by way of examples, which should not be construed as limiting the present invention thereto.

EXAMPLE 1

420 parts by weight of gamma-$Fe_2O_3$, 65 parts by weight of a vinyl chloride-vinyl acetate copolymer, 110 parts by weight of a polyurethane elastomer, 5 parts by weight of yolk lecithin, 600 parts by weight of methyl ethyl ketone, 600 parts by weight of toluene, different amounts of an aluminium oxide powder on which a carbon black powder having an average size of 70 millimicrons and a specific surface area of 31 $m^2/g$ was adsorbed in an amount of 7 wt% were mixed in a sand mill for about 20 hours, followed by adding an isocyanate curing agent, thereby obtaining magnetic paints. Each magnetic paint was applied onto a polyester film, dried, calendered and cured at a temperature of 45° C. for 40 hours. The resulting magnetic layer had a dry thickness of about 5 microns after curing. These tapes were slit into ½ inch wide magnetic tapes for video recording purposes.

COMPARATIVE EXAMPLE 1

The general procedure of Example 1 was repeated using, instead of the carbon black-adsorbed aluminium oxide powder, different amounts of a carbon black powder having an average size of 70 millimicrons and a specific surface area of 31 $m^2/g$ and an aluminium oxide powder having an average size of 0.5 micron, and the carbon black-adsorbed aluminium oxide in amounts outside the range of the present invention, thereby obtaining magnetic tapes.

These tapes were subjected to the measurement of the demagnetization characteristic after repetition of reproduction cycles, surface resistivity, light transmittance at a wavelength of 9000 angstrom, and squareness. The results are shown in Table below, in which Test Nos. 1 through 6 are for the tapes of the present invention and Test Nos. 7 through 15 are for comparative purposes.

TABLE

| Test No. | Amount of Carbon black-adsorbed $Al_2O_3$ (wt % based magnetic particles) | Amount of Carbon Black (wt. % based on magnetic particles) | Amount of $Al_2O_3$ (wt % based on magnetic particles) | Demagnetization characteristic | Surface resistivity | Light transmittance | Squareness |
|---|---|---|---|---|---|---|---|
| 1 | 0.5 | 0 | 0 | o | o | o | o |
| 2 | 0.7 | 0 | 0 | o | o | o | o |
| 3 | 1.4 | 0 | 0 | o | o | o | o |
| 4 | 10.0 | 0 | 0 | o | o | o | o |
| 5 | 15.0 | 0 | 0 | o | o | o | o |

TABLE-continued

| Test No. | Amount of Carbon black-adsorbed Al₂O₃ (wt % based magnetic particles) | Amount of Carbon Black (wt. % based on magnetic particles) | Amount of Al₂O₃ (wt % based on magnetic particles) | Demagnetization characteristic | Surface resistivity | Light transmittance | Squareness |
| --- | --- | --- | --- | --- | --- | --- | --- |
| 6 | 30.0 | 0 | 0 | o | o | o | o |
| 7 | 0.14 | 0 | 0 | x | x | x | x |
| 8 | 40.0 | 0 | 0 | o | o | o | x |
| 9 | 0 | 0 | 0 | x | x | x | o |
| 10 | 0 | 0.43 | 0 | x | x | x | o |
| 11 | 0 | 0.86 | 0 | x | o | o | x |
| 12 | 0 | 0 | 0.57 | x | x | x | o |
| 13 | 0 | 0 | 1.14 | o | x | x | o |
| 14 | 0 | 0.14 | 0.57 | x | x | x | o |
| 15 | 0 | 0.86 | 1.14 | o | o | o | x |

Note
The demagnetization characteristic was evaluated as "o" at a level below −1.5 dB and as "x" at a level higher than −1.5 dB when the tape was repeatedly travelled 200 times.
The surface resistivity was evaluated as "o" at a level below $10^9$ ohms/cm² and as "x" at a higher level.
The light transmittance was evaluated as "o" at a level below 0.5% and as "x" at a higher level.
The squareness was evaluated as "o" at a level over 0.80 and as "x" at a lower level.

As will be seen from the above results, carbon black, when used singly, gives a significant influence on the surface resistivity and light-shielding ability when contained in an amount of over 0.86 wt% based on the magnetic particles. Al₂O₃ gives a substantial influence on the demagnetization characteristic when used singly and contained in an amount over 1.14 wt%. In order to improve the surface resistivity, light-shielding property, and demagnetization characteristic at the same time, relatively large amounts of the carbon black and aluminium oxide are needed. This results in a smaller packing density of magnetic particles with electromagnetic characteristics becoming poor especially when bulky carbon black powder is used. For instance, magnetic characteristics such as a squareness deteriorate.

In contrast, when the carbon black-adsorbed alumina is contained in the magnetic layer in an amount as small as 0.5 wt% or more, based on the magnetic particles, the surface resistivity, light-shielding property and demagnetization characteristic are improved. In addition, magnetoelectric characteristics such as a squareness lower only in a small degree even when the adsorbed alumina is added in an amount of up to 30 wt%. This is considered to be due to good dispersability of the carbon black-adsorbed metal oxide.

EXAMPLE 2

The general procedure of Test No. 3 of Example 1 was repeated using, instead of the carbon black powder adsorbed on the alumina, carbon black powders having average sizes of 24 and 13 millimicrons and specific surface areas of 120 and 900 m²/g, respectively. The resulting magnetic tapes were subjected to the measurement in the same manner as in Example 1.

Similar results are obtained with regard to the characteristic properties.

EXAMPLE 3

The general procedure of Example 1 was repeated using, instead of the carbon black-adsorbed alumina, carbon black-adsorbed TiO₂ particles and carbon black-adsorbed Cr₂O₃ particles. The resulting magnetic tapes were subjected to the measurement in the same manner as in Example 1. As a result, it was found that the magnetic tapes using the adsorbed TiO₂ particles showed similar results in the range of the particles from 0.5 to 30 wt% based on the magnetic particles. On the other hand, the magnetic tapes using the carbon black-adsorbed Cr₂O₃ particles deteriorate in chromatic SN ratio and squareness when used in an amount exceeding 15 wt%. Accordingly, the content of the carbon black-adsorbed Cr₂O is determined to be in the range of from 0.5 to 15 wt% of the magnetic particles used.

EXAMPLE 4

500 parts by weight of Co-containing iron oxide magnetic particles, 70 parts by weight of a vinyl chloride resin, 80 parts by weight of a polyurethane elastomer, 5 parts by weight of yolk lecithin, 700 parts by weight of methyl ethyl ketone, 700 parts by weight of toluene, mixtures of below 150 parts by weight of carbon black-adsorbed titanium dioxide particles, and below 100 parts by weight of carbon black-adsorbed chromium (III) oxide particles are mixed in a sand mill for about 20 hours, followed by adding an isocyanate curing agent, thereby obtaining magnetic paints. The carbon black adsorbed on the metal oxides was in the form of a powder having an average size of 70 millimicrons and a specific surface area of 31 m²/g and was adsorbed in an amount of 10 wt%. The magnetic paints were each applied onto a polyester film, dried, calendered and cured at a temperature of 45° C. for 40 hours. The magnetic recording layer had a thickness of about 5 microns after curing. The thus cured films were slit into ½ inch wide magnetic tapes on reels.

The magnetic tapes were subjected to the measurement of the squareness, light transmittance, demagnetization characteristic, and chromatic SN ratio. The results are shown in FIGS. 1 through 4.

FIG. 1 reveals that the squareness is as high as over 0.8 when the total amount of both types of particles is below about 30 wt%. In the magnetic tape shown in the figure, although the mixing ratio by weight of the carbon black-adsorbed TiO₂ and the carbon black-adsorbed Cr₂O₃ was 3:2, the squareness is excellent when the total amount is below 30 wt% irrespective of the mixing ratio.

In order to check whether or not the magnetic tapes obtained in this example entail malfunction of a tape end detector mechanism of a recording and reproducing apparatus, the light transmittance of the tapes was measured using a wavelength of 9000 angstrom. As a result, it was found that the light transmittance was in the range below about 0.5%, which was satisfactory for the detection, when the total amount of the adsorbed metal oxides was in the range over about 0.5 wt%, inclusive. This is particularly shown in FIG. 2.

In order to determine the durability of the magnetic layer of each tape, the relation between the number of reproduction cycles and the demagnetization characteristic was determined. When the total amount of the carbon black-adsorbed chromium (III) oxide and carbon black-adsorbed titanium dioxide particles was set at a level of 20 wt% based on the magnetic particles and the adsorbed chromium (III) oxide particles were varied in the range of from 0 to 20 wt%, the demagnetization value was much smaller than the value of the magnetic tape containing neither carbon black-adsorbed chromium (III) oxide particles nor carbon black-adsorbed titanium dioxide particles. Thus, the magnetic layers were found to be excellent in the durability.

Figure 4:
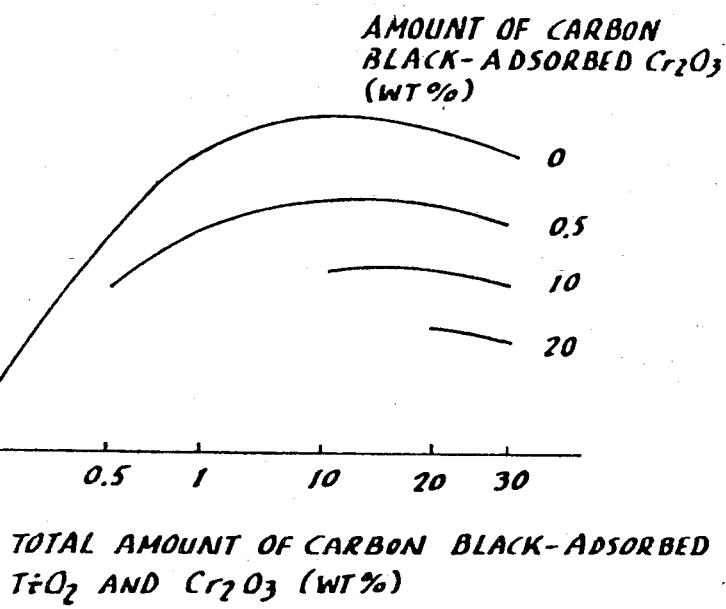
FIG. 4 is a graphical representation of the relation between the chromatic SN ratio and the total amount of carbon black-adsorbed $Cr_2O_3$ and $TiO_2$ particles for different amounts of the $Cr_2O_3$ particles.

FIG. 4 shows the relation between the chromatic SN ratio and the total amount of both types of adsorbed metal oxides for different amounts of the carbon black-adsorbed chromium (III) oxide particles. From the results of the figure, it will be seen that the chromatic SN ratio increases with an increase of the total amount but decreases with an increase of the adsorbed chromium (III) oxide content.

In view of the above results, the total amount of the carbon black-adsorbed chromium (III) oxide and the carbon black-adsorbed titanium dioxide is found to be conveniently in the range of from 0.5 to 30 wt% of the magnetic particles used. In this case, the carbon black-adsorbed chromium (III) oxide particles should be used in an amount of from 0.5 to 15 wt% of the magnetic particles.

EXAMPLE 5

The general procedure of Example 4 was repeated using, instead of the mixtures of carbon black-adsorbed $TiO_2$ and $Cr_2O_3$ particles, mixtures of carbon black-adsorbed $Al_2O_3$ and adsorbed $TiO_2$ or $Cr_2O_3$. The resulting tapes were measured in the same manner as in Example 4. By the measurement, it was confirmed that the mixture of the carbon black-adsorbed $Al_2O_3$ particles and the carbon black-adsorbed $TiO_2$ or $Cr_2O_3$ could be used in the total amount ranging from 0.5 to 30 wt% of the magnetic particles. If the $Cr_2O_3$ particles are used in combination, its content was up to 15 wt%.

What is claimed is:

1. A magnetic recording medium comprising a support, and a magnetic recording layer formed on at least one side of said support, said magnetic recording layer being made of a dispersion, in a resin binder, of magnetic particles and non-magnetic particles of a carbon black-adsorbed metal oxide which is selected from the group consisting of aluminum oxide in an amount of 0.5 to 30 wt% of the magnetic particles, titanium dioxide in an amount of 0.5 to 30 wt% of the magnetic particles, chromium (III) oxide in an amount of 0.5 to 15 wt% of the magnetic particles, and mixtures thereof, wherein, when the particles are mixtures of carbon black-adsorbed titanium dioxide and carbon black-adsorbed aluminum oxide, they are present in the total amount of 0.5 to 30 wt% of said magnetic particles; when the particles are mixtures of carbon-black adsorbed titanium dioxide and carbon-black adsorbed chromium (III) oxide, they are used in the total amount of 0.5 to 30 wt% of said magnetic particles provided that said chromium (III) oxide is used in an amount from 0.5 to 15 wt%; and when the particles are mixtures of particles of carbon black-adsorbed aluminum oxide and carbon black chromium (III) oxide, they are used in the total amount of from 0.5 to 30 wt% of said magnetic particles provided that said chromium (III) oxide is used in an amount of from 0.5 to 15 wt%, and wherein said carbon black powder has an average size below 100 millimicrons and a surface area of above 30 $m^2/g$ and is adsorbed in an amount of from 0.5 to 20 wt% based on the weight of the non-magnetic metal oxide particles.

2. The medium according to claim 1, wherein the carbon black powder has an average size ranging from 10 to 70 millimicrons and a specific surface area ranging from 30 to 900 $m^2/g$.

3. The medium according to claim 1, wherein said support has said magnetic recording layer on one side thereof.

4. The medium according to claim 1, wherein said support has said magnetic layer on each side thereof.

5. The medium of according to claim 1, wherein the carbon black powder is adsorbed onto the metal oxide powder by mixing said carbon black powder with said metal oxide powder under high temperature and high pressure.

* * * * *